(12) United States Patent
Noh et al.

(10) Patent No.: US 12,143,698 B2
(45) Date of Patent: Nov. 12, 2024

(54) METHOD FOR CREATING HYPERSPECTRAL HIGH SPEED CAMERA IMAGE USING GENERATIVE ADVERSARIAL NETWORK ALGORITHM

(71) Applicant: Defense Agency for Technology and Quality, Gyeongsangnam-do (KR)

(72) Inventors: Sang Woo Noh, Gyeongsangnam-do (KR); Tae Hwan Kim, Gyeongsangnam-do (KR); Jin Woo Ahn, Gyeongsangnam-do (KR); Han Gyu Kim, Seoul (KR)

(73) Assignee: Defense Agency for Technology and Quality, Gyeongsangnam-do (KR)

( * ) Notice: Subject to any disclaimer, the term of this patent is extended or adjusted under 35 U.S.C. 154(b) by 220 days.

(21) Appl. No.: 17/558,835

(22) Filed: Dec. 22, 2021

(65) Prior Publication Data

US 2022/0210347 A1  Jun. 30, 2022

(30) Foreign Application Priority Data

Dec. 24, 2020  (KR) .......................... 10-2020-0183353

(51) Int. Cl.
*H04N 23/11*   (2023.01)
*G06T 7/00*   (2017.01)
(52) U.S. Cl.
CPC ............... *H04N 23/11* (2023.01); *G06T 7/97* (2017.01); *G06T 2207/10036* (2013.01); *G06T 2207/20081* (2013.01)
(58) Field of Classification Search
CPC .......................................... G06T 2207/10036
See application file for complete search history.

(56) References Cited

U.S. PATENT DOCUMENTS

| | | | |
|---|---|---|---|
| 2015/0371431 A1* | 12/2015 | Korb | G06T 7/75 382/113 |
| 2018/0080827 A1* | 3/2018 | Kim | G01J 3/2823 |
| 2020/0211215 A1* | 7/2020 | Colosimo | G01S 11/12 |
| 2022/0196471 A1* | 6/2022 | Gerwe | H04N 23/11 |

FOREIGN PATENT DOCUMENTS

| | | |
|---|---|---|
| KR | 10-2017-0063182 | 6/2017 |
| KR | 10-2175192 | 11/2020 |
| KR | 10-2187654 | 12/2020 |

* cited by examiner

*Primary Examiner* — Jayanti K Patel
*Assistant Examiner* — Christopher Kingsbury Glover

(57) ABSTRACT

A method creating a high-speed hyperspectral video by acquiring images from a hyperspectral high speed camera and forming a of a three-dimensional data cube by including spectra for each pixel in addition to a two-dimensional spatial information of an image taken with a general camera. Dividing successive three-dimensional data cubes obtained by photographing images with a spectral scanning type hyperspectral camera. Acquiring the three-dimensional data cubes for each specific time point and creating three-dimensional data cubes for as many as the number of spectra. Then separating a region corresponding to a moving object and a region corresponding to a background from the created data cubes. Acquiring spectral values according to spatial locations of the images and reconstructing a three-dimensional data cube with all spectral values for each specific time point with regard to the region with motion through a generative adversarial network algorithm.

1 Claim, 2 Drawing Sheets

METHOD FOR CREATING HYPERSPECTRAL HIGH SPEED CAMERA IMAGE USING GENERATIVE ADVERSARIAL NETWORK ALGORITHM

RELATED APPLICATION

This application claims the benefit of priority of Korea Patent Application No. 10-2020-0183353 filed on Dec. 24, 2020, the contents of which are incorporated herein by reference in their entirety.

FIELD AND BACKGROUND OF THE INVENTION

The present invention relates to a method for creating a high-speed hyperspectral video by dividing successive three-dimensional data cubes obtained by photographing images with a spectral scanning type hyperspectral camera so as to be capable of having a temporal resolution within the number of spectra.

Hyperspectral cameras have been used to detect and identify objects or phenomena that are difficult to distinguish with the naked eye in various fields such as environment and national defense. Because they exhibit good performance in target detection and tracking, they have been used to detect and identify camouflaged tanks, military vehicles, soldiers, and the like in the national defense field.

Existing hyperspectral cameras have taken several seconds or more to create a three-dimensional data cube corresponding to a single photo.

SUMMARY OF THE INVENTION

It is an object of the present invention to provide a method for creating a hyperspectral high-speed camera image having a high frame rate by using an existing hyperspectral camera.

In order to achieve the above-described object, the present invention provides a method for creating a hyperspectral high speed camera image comprising a step of taking images with a spectral scanning type hyperspectral camera and then separating each data cube into spectral values for each specific time point; and a step of creating a data cube having all spectral values for each specific time point through a generative adversarial network.

In order to create a specific time point spectrum by using the different time point spectrum values, the present invention can detect a moving object and separate it from a background, thereby separating spectra corresponding to the moving object and spectra corresponding to the background.

In the present invention, a data cube set having all spectral values for each specific time point may be created from data cube sets having only a specific spectral value for each specific time point by using a generative adversarial network algorithm considering temporal continuity.

Specifically, the present invention provides a method for creating a hyperspectral high speed camera image, comprising a first step of taking images with a spectral scanning type hyperspectral high speed camera and then separately acquiring the acquired three-dimensional data cubes for each specific time point that each spectrum has been taken to create three-dimensional data cubes as many as the number of spectra; a second step of separating a region corresponding to a moving object and a region corresponding to a background from the created data cubes through a process of detecting the moving object to separate it from the background; and a third step of acquiring spectral values according to spatial locations of the images by using the values of each spectrum corresponding to the same coordinates in the separated background region, and reconstructing a three-dimensional data cube with all spectral values for each specific time point with regard to the region with motion through a generative adversarial network algorithm.

In the first step of the present invention, the data of the newly created three-dimensional data cube for each time point may be in a state to hold only specific spectral values.

In the first step of the present invention, the hyperspectral camera may have a function of viewing data values for each spectrum.

According to the present invention, a high-speed hyperspectral camera can be implemented by utilizing an existing hyperspectral camera that takes several seconds or more to create a three-dimensional data cube corresponding to a single photo.

DESCRIPTION OF SPECIFIC EMBODIMENTS OF THE INVENTION

Hereinafter, the present invention will be described in detail.

Figure 1:
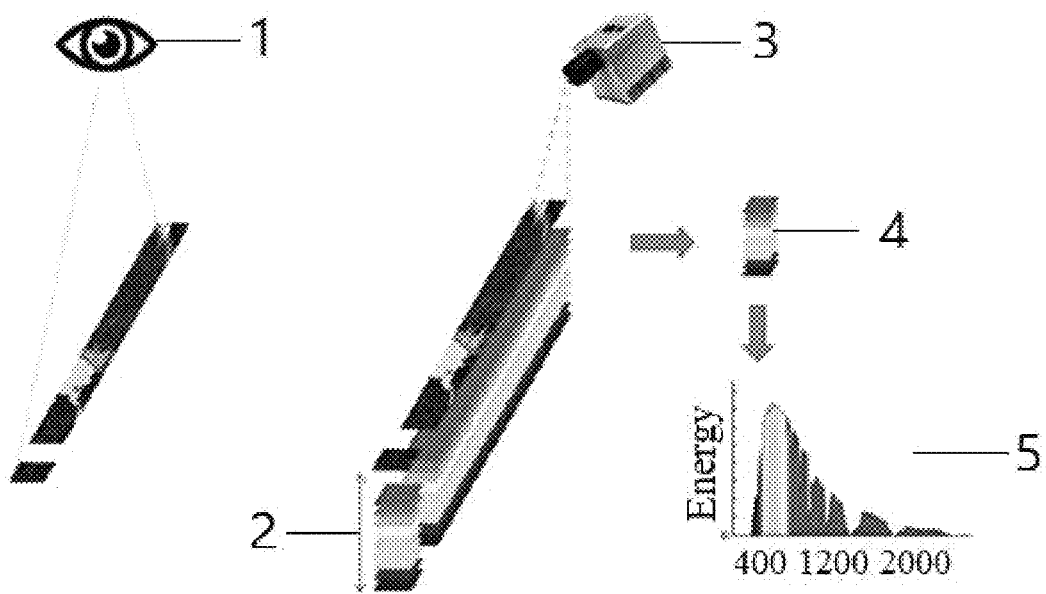
FIG. 1 shows image information acquired with the human eye and image information acquired with a hyperspectral sensor.

The image taken by a hyperspectral camera includes all information on continuous spectra that can be used to identify a material for each pixel when acquiring the image, as shown in FIG. 1. The data acquired by the hyperspectral camera are formed in the form of a three-dimensional data cube by including the spectra for each pixel in addition to the two-dimensional spatial information of the image taken with a general camera.

Figure 2:
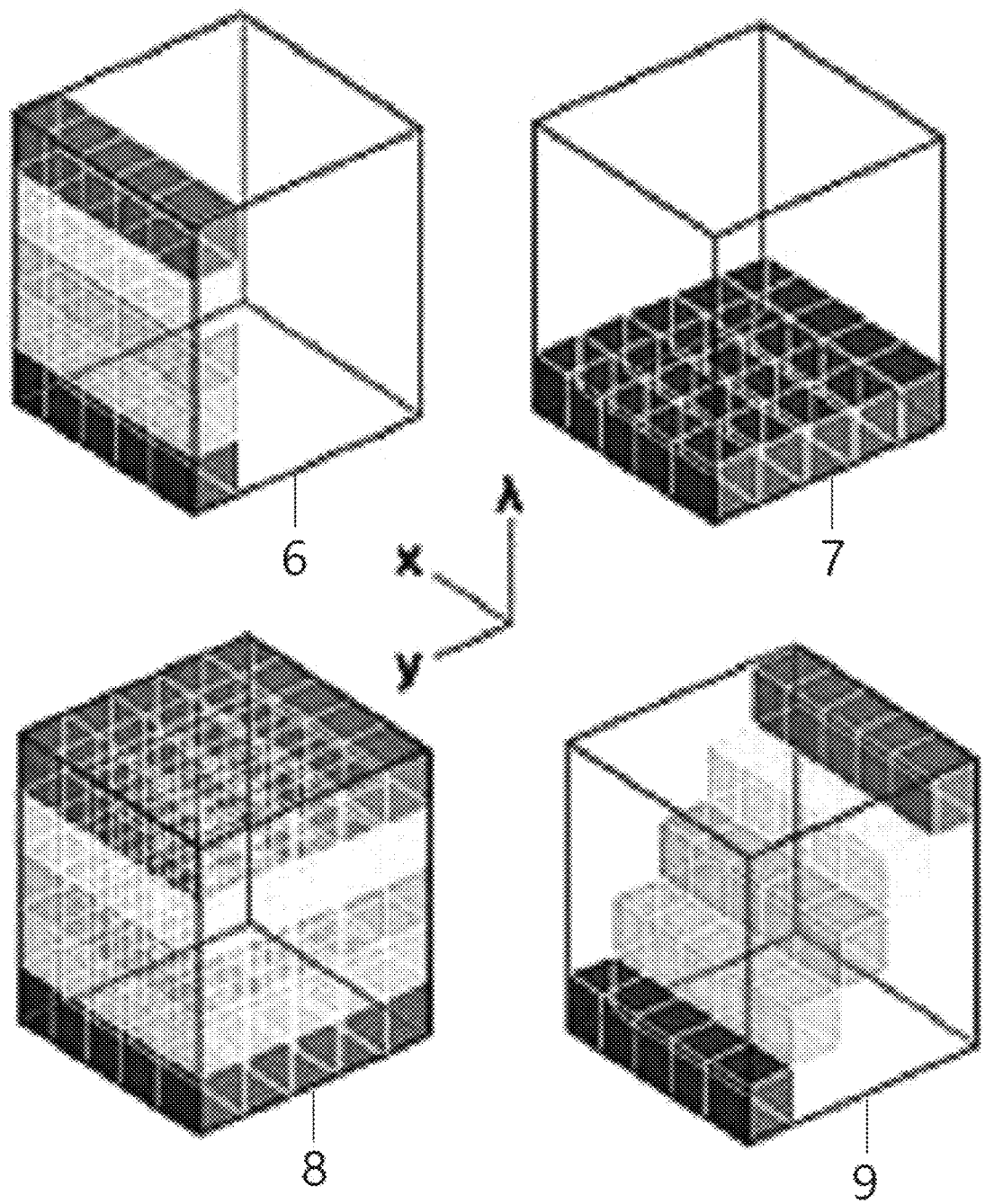
FIG. 2 shows a hyperspectral camera scanning method.

As shown in FIG. 2, the scanning method of the hyperspectral camera includes spatial scanning, spectral scanning, non-scanning, and spatiospectral scanning methods.

The spatial scanning method is a method of sequentially scanning other spatial regions after acquiring the entire spectrum for a specific spatial region, and the spectral scanning method is a method of sequentially scanning other spectra after scanning a specific spectrum of the entire spatial region. The non-scanning method, also called a snapshot, is a method that a sensor is divided into multiple spectral regions to simultaneously measure them.

As described above, the spectral scanning method is a method of sequentially scanning spatial regions of specific spectra, so that the respective spectra can be viewed as information obtained at different successive time zones. Therefore, if the photographed image is divided on the time axis, it is possible to separate as much as the scanning time divided by the number of spectra.

In general, images photographed at high speed have a large number of pixels containing overlapping information between the previous and next frames for each frame, so that using the linkage between the limited specific time point information of the respective spectra photographed by the spectral scanning method, it is possible to create three-dimensional cubes for all time points through a generative adversarial network (GAN) algorithm. The generative adversarial network (GAN) is one of machine learning methods that automatically create images or videos close to the real thing while generative models compete with discriminant models.

The method for creating a hyperspectral high-speed camera image using a generative adversarial network algorithm according to the present invention can be performed in the following steps.

In the first step, images are taken with a spectral scanning type hyperspectral high-speed camera, and then the acquired three-dimensional data cubes are separately acquired for each specific time point that each spectrum has been taken to create three-dimensional data cubes as many as the number of spectra. That is, images are taken with a spectral scanning type hyperspectral camera, and then each data cube is separately acquired as spectral values for each specific time point. The data of the newly created three-dimensional data cube for each time point are in a state to hold only specific spectral values.

The hyperspectral camera may provide a function to view data values for each spectrum. As an example of a general camera, if a picture is taken, it is the same as the R channel values, G channel values and B channel values for each pixel of the picture can be identified. For example, if it has been photographed at 1 fps (frame per second) for 1 second with a spectral scanning type 3-channel RGB camera (assuming that the spectrum is photographed in the order of R, G and B), actually, the time for which the R channel data has been photographed is 0~0.33 seconds, the time for which the G channel data has been photographed is 0.33 to 0.67 seconds, and the time for which the B channel data has been photographed is 0.67~1 second. Therefore, the data at each time point for each channel are contained in the R channel as 0~0.33 sec, the G channel as 0.33~0.67 sec and the B channel as 0.67~1 sec. Even for the spectral scanning type hyperspectral camera, only the number of spectra (channels) has been expanded, which can be regarded as the same concept.

Thereafter, in an optional embodiment, a data cube, which holds all spectral values, consisting of contiguous spectra can be selected at the generation time point with the least movement (considering camera movement, background change, foreground movement, etc.) for the shooting time by using general photos taken in a stopped state and a deep learning algorithm.

Furthermore, in another optional embodiment, a data cube, which holds all spectral values, consisting of contiguous spectra can be selected at the generation time point with the least movement (considering camera movement, background change, foreground movement, etc.) for the shooting time by using a motion blur region detection algorithm. That is, data having the motion blur region with the smallest value can be selected by the motion blur region detection algorithm.

In the second step, a region corresponding to a moving object and a region corresponding to a background among the spatial coordinates of the data tube are separated from the created (or selected) data cubes (i.e., the spectral values of the background and the moving object are separated) through a process of detecting the moving object to separate it from the background (i.e., by using a moving object searching/detection algorithm). Specifically, in order to create a spectrum at a specific time point by utilizing the spectrum values of different time points, a moving object is detected and separated from a background, whereby a spectrum corresponding to the moving object and a spectrum corresponding to the background are separated (i.e., a background and a moving object are distinguished, which can be matched without using the algorithm).

As the moving object searching/detection algorithm, a robust principle component analysis algorithm may be used. Specifically, when a background is taken, it can be extracted as the principle component, and when a moving object is taken, it can be expressed as an outlier and separated from the background.

In addition, in an optional embodiment, by extracting spectral values corresponding to R, G and B channels of a general picture from the selected data cube and comparing them with the general pictures taken in a stopped state using a deep learning algorithm, a region estimated to be in motion and a region estimated to be stopped may be separated among the spatial coordinates of the data cube. That is, in order to find a reference point that creates a spectrum at a specific time point by using the spectrum values of another time point, it is possible to find a data cube with little movement and a stopped region by using red (R), green (G) and blue (B) information values of a general image taken in a stopped state and the taken hyperspectral image.

Furthermore, in another optional embodiment, by extracting spectral values corresponding to R, G and B channels of a general picture from the selected data cube and using a motion blur region detection algorithm, a region estimated to be in motion and a region estimated to be stopped may be separated among the spatial coordinates of the data cube. That is, in order to find a reference point that creates a spectrum at a specific time point by using the spectrum values of another time point, it is possible to find a data cube with little movement and a stopped region by using red (R), green (G) and blue (B) information values of a general image taken in a stopped state and the taken hyperspectral image.

In the third step, by using the values of each spectrum corresponding to the same coordinates in the separated background (or stopped) region, the relationship of the spectrum according to the spatial locations of the images can be known, and with reference to this, a three-dimensional data cube with all spectral values for each specific time point with regard to the region with motion through a generative adversarial network algorithm is reconstructed. That is, a data cube with all spectral values for each specific time point is created through a generative adversarial network. Specifically, by utilizing the generative adversarial network algorithm considering temporal continuity, a data cube set having all spectral values for each specific time point is created from data cube sets having only specific spectral values for each specific time point.

Specifically, when assuming that it is desired to learn mapping $G_Y: X \rightarrow Y$ as in Equation 1 below, $G_Y$ is adjusted so as to minimize a reconstruction error in paired data samples $\{(x_i, y_i)\}$. Here, $x_i \in X$, and $y_i \in Y$. In Equation 1, min is a minimum value function, and $G_Y$ is a generator function.

$$\min_{G_Y} \sum_i \|y_i - G_Y(x_i)\|^2 \qquad \text{[Equation 1]}$$

Assuming that a recurrent loss is obtained by n-th successive substitution of P (x) by using Equation 2 below, in Equation 3, T means time and N means the number of spectra, and the generator function $G_i$ learns the input data $x_{in}$ so that it may become the value $x_{t(n+i)}$ of the next spectrum belonging into the same frame. Finally, by using the identifier $G_i$, all spectra at a specific spectrum n time point are restored.

In FIG. 1, 1 is a human eye, 2 is a spectral dimension, 3 is a hyperspectral sensor, 4 is a pixel and each pixel includes continuous spectra that are used to identify a material in the pixel, and 5 is a spectral fingerprint.

In FIG. 2, 6 is a spatial scanning, 7 is a spectral scanning, 8 is a non-scanning (snapshot), and 9 is a spatio-spectral scanning.

$$L_T(P_N) = \Sigma_T \Sigma_N \|x_{tn} - P(P(P(\ldots P(x_{t(n+N)})) \ldots ))\|^2 \quad \text{[Equation 2]}$$

$$\min \Sigma_T \Sigma_N \|x_{tn} - P_i G_i(x_{t(n+i)})\|2 \quad \text{[Equation 3]}$$

In Equations 2 and 3, min is the minimum value function, T is the total time of the image, $x_{tn}$ is the n-th data value at time t, $P_i$ is the prediction function, $G_i$ is the generator function, $x_{t(n+i)}$ is the n+i-th data value at time t, $L_T$ is the loss function, and $x_{(t+1)n}$ is the n-th data value at time t+1.

What is claimed is:

1. A method for creating a hyperspectral high speed camera image, comprising:

a first step of taking images with a spectral scanning type hyperspectral high speed camera having a function of viewing data values for each spectrum, wherein data acquired by the spectral scanning type hyperspectral high speed camera are formed in the form of a three-dimensional data cube by including spectra for each pixel in addition to a two-dimensional spatial information of an image taken with a general camera, and then separately acquiring the acquired three-dimensional data cubes for each specific time point that each spectrum has been taken to create three-dimensional data cubes as many as the number of spectra;

a second step of separating a region corresponding to a moving object and a region corresponding to a background from the created data cubes through a process of detecting the moving object to separate it from the background; and a third step of acquiring spectral values according to spatial locations of the images by using the values of each spectrum corresponding to the same coordinates in the separated background region, and reconstructing a three-dimensional data cube with all spectral values for each specific time point with regard to the region with motion through a generative adversarial network algorithm, in the third step, the generative adversarial network is performed using the following Equations 1 to 3, in the third step, to learn mapping $G_Y: X \rightarrow Y$ by Equation 1 below, $G_Y$ is adjusted so as to minimize a reconstruction error in paired data samples $\{(x_i, y_i)\}$, assuming that a recurrent loss is obtained by n-th successive substitution of P(x) by using Equation 2 below, in Equation 3, a generator function $G_i$ learns input data $x_{tn}$ so that the input data $x_{tn}$ become a value $x_{t(n+i)}$ of a next spectrum belonging into the same frame, finally, by using the identifier $G_i$, all spectra at a specific spectrum n time point are restored:

$$\min_{G_Y} \sum_i \|y_i - G_Y(x_i)\|^2 \quad \text{[Equation 1]}$$

$$L_T(P_N) = \sum_T \sum_N \|x_{tn} - P(P(P(\ldots P(x_{t(n+N)})) \ldots ))\|^2 \quad \text{[Equation 2]}$$

$$\min \sum_T \sum_N \|x_{tn} - P_i G_i(x_{t(n+i)})\|^2 \quad \text{[Equation 3]}$$

In Equations 1, 2 and 3, $x_i \in X$, $y_i \in Y$, min is a minimum value function, $G_Y$ is a generator function, $L_T$ is a loss function, $P_N$ is a prediction function, T is the total time of the image, N means the number of spectra, $x_{tn}$ is n-th data value at time t, $x_{t(n+N)}$ is n+N-th data value at time t, $P_i$ is a prediction function, $G_i$ is a generator function, and $x_{t(n+i)}$ is n+i-th data value at time t.

\* \* \* \* \*